UNITED STATES PATENT OFFICE.

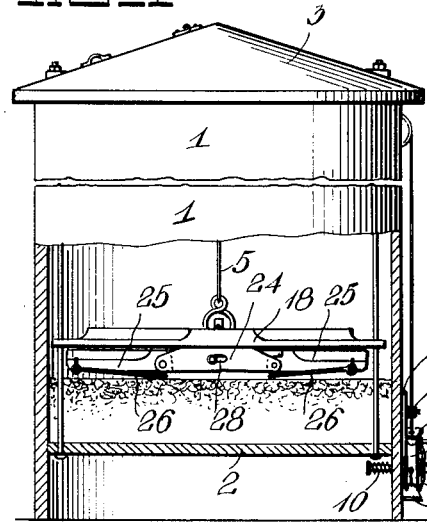
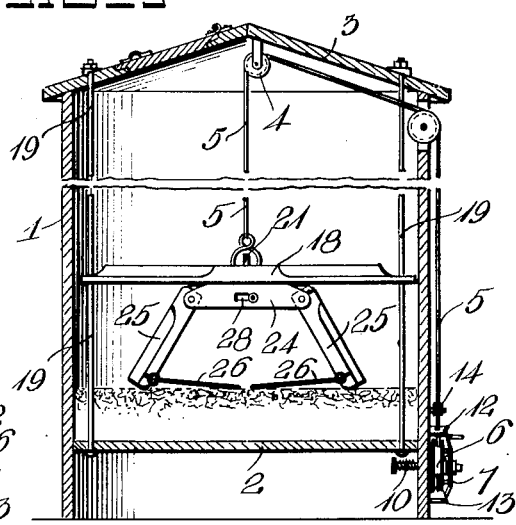
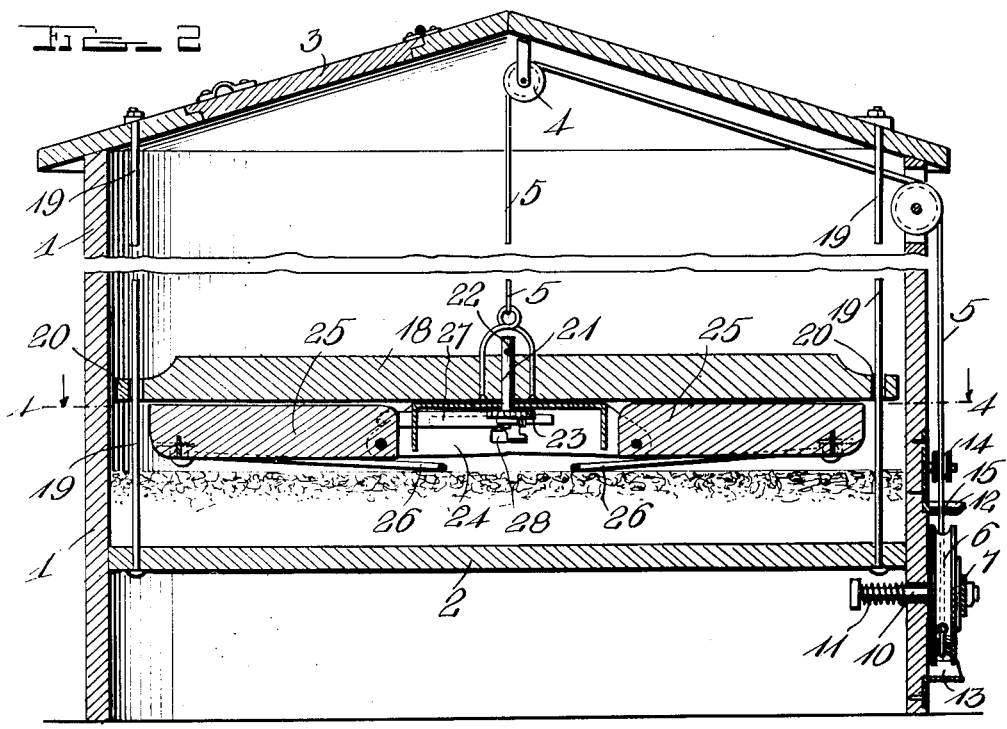

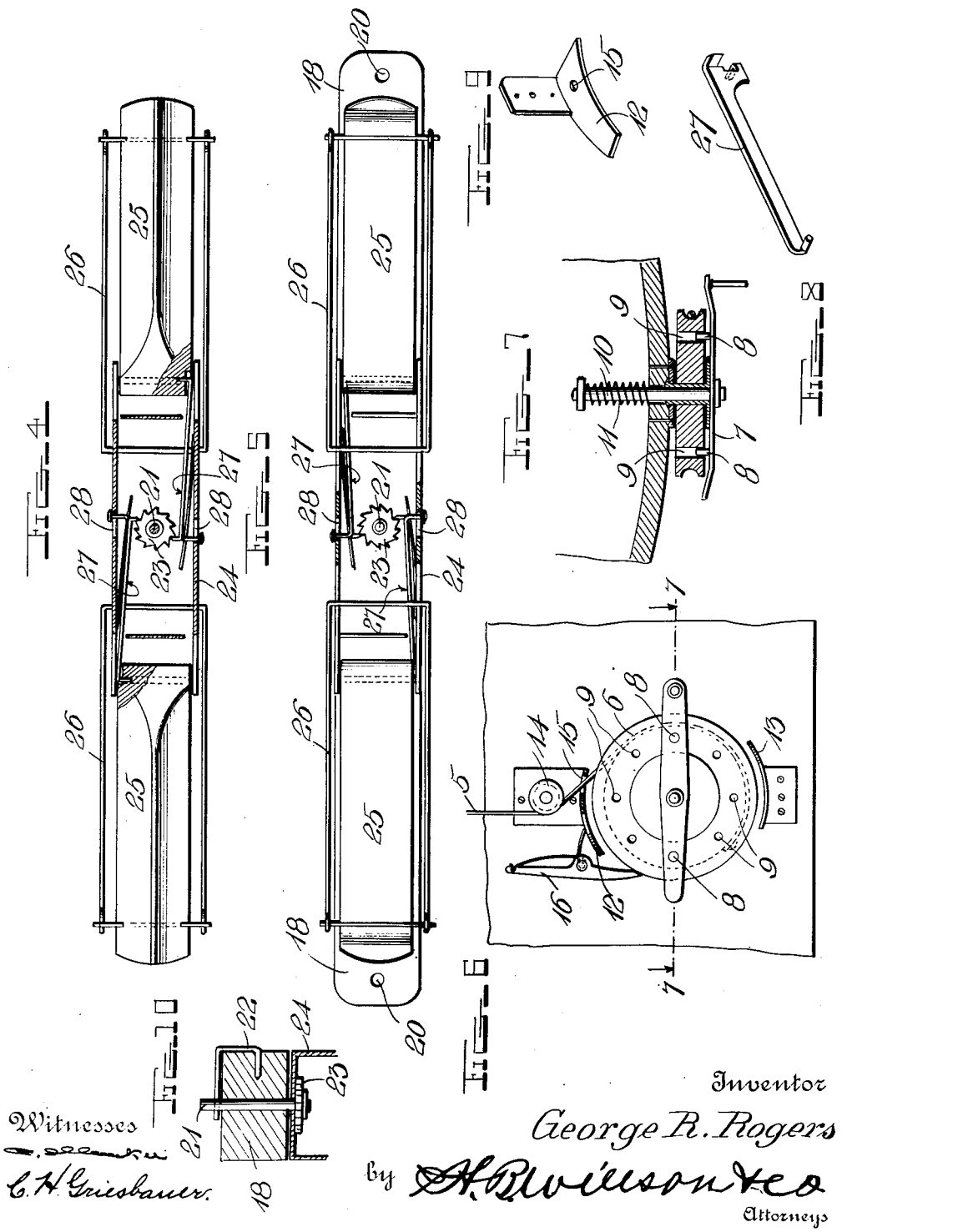

GEORGE R. ROGERS, OF RACCOON, INDIANA.

SILO-PACKER.

No. 931,090.

Specification of Letters Patent. Patented Aug. 17, 1909.

Application filed April 12, 1909. Serial No. 489,387.

*To all whom it may concern:*

Be it known that I, GEORGE R. ROGERS, a citizen of the United States, residing at Raccoon, in the county of Putnam and State of Indiana, have invented certain new and useful Improvements in Silo-Packers; and I do declare the following to be a full, clear, and exact description of the invention, such as will enable others skilled in the art to which it appertains to make and use the same.

My invention relates to packing devices particularly adapted for use in silos.

The operation of packing the silage in the silo has heretofore been accomplished by placing one or two men within the silo and tamping the silage down as it was placed therein. This operation was an extremely disagreeable one and it is the object of the invention to provide a device which will obviate the difficulty and disagreeableness encountered in getting down into the silo and tamping the silage therein.

A further object of the invention is the provision of means for causing the packing device to rotate so that it engages the material at different points upon each stroke.

A still further object of the invention is the provision of novel means for automatically raising and lowering the packing device in the silo and means for guiding the same in its movements.

With these and other objects in view, the invention consists of certain novel features of construction, combination and arrangement of parts, as will be more fully described and particularly pointed out in the appended claims.

In the accompanying drawings, Figure 1 is a side elevation of the silo with a portion of its wall broken away so as to more clearly illustrate the application of the device; Fig. 2 is a vertical section through the silo showing the packing and guiding arms in alinement; Fig. 3 is a side elevation showing the position of the packing device when in raised position; Fig. 4 is a horizontal sectional view of the packing arms taken on line 4—4 of Fig. 2; Fig. 5 is a bottom plan view of the packing arms and the attaching yoke which connects them to the guiding arms; Fig. 6 is a detail side elevation of the reciprocating mechanism with a hand lever applied thereto; Fig. 7 is a detail sectional view on the line 7—7 of Fig. 2; Fig. 8 is a detail perspective view of one of the ratchet pawls; Fig. 9 is a detail perspective view of one of the operating cams; and Fig. 10 is a detail section through the tamping arm taken to one side of the ratchet shaft.

This device is preferably operated by the same power which makes the silage but as shown in the drawings it may be operated by the hand equally as well. Where the device is operated through the machinery of the silage cutter the entire operation is automatic.

In the drawings, 1 represents a silo having a bottom shown at 2, and a top at 3. This construction may be of any suitable type and may be constructed of any suitable material such as lumber or cement as is customary. Secured to the top 3, is a pulley 4, over which the operating cable, 5, is adapted to pass from the pulley which is mounted in the wall of the silo. The power end of the cable is attached to a drum which is mounted upon the side of the silo and adapted to be operated by the hand lever, 7, and the pins, 8, thereon which enter the apertures, 9, in the drum. The drum is mounted upon a shaft, 10, which is journaled in the wall of the silo and has arranged on its inner end a spiral spring, 11, which normally keeps the pins, 8, in engagement with the apertures, 9, in the drum, the lever being secured directly to the end of the shaft. Arranged on either side of the drum in diametrical opposite positions are suitable cams, 12 and 13, both of which are adapted to engage the extended ends of the lever 7, and throw the pins, 8, out of engagement with the apertures, 9, in the drum, thus releasing the same and permitting the weight of the packing device to rotate the drum in a reverse direction. The operating cable is guided to the pulley by means of an idler, 14, which it engages after passing through an aperture, 15, on the cam, 12. The drum is preferably held so as to prevent lost motion by the spring pressed brake, 16.

The operating end of the guiding arms, 18, which are balanced on either side of the cable and are guided in their movement by the vertical guide rods or wires, 19, which are stretched between the bottom 2, and the top, 3, and pass through the apertures, 20, in the ends of said arms. Passing through the center of the arms, 18, is a shaft, 21, which is keyed to the arms by a wire, 22, which passes therethrough and is secured on the rear side to the arms, 18. This shaft has secured to its lower end a ratchet wheel, 23, and supports pivotally mounted upon the shaft, the yoke member, 24, having pivoted in its outer ends the packing arms, 25. These arms are adapted to drop down at their lower end when the guiding arms are raised and to be forced to a position parallel with the guiding arms by contact with the material being packed. Each one of the arms carries at its outer end the pivoted inwardly extending smoothing devices, 26, which constantly rest upon the material in either of their positions and tend, when the arms rotate as will be hereinafter described, to level the silage being operated upon. Each packing arm has pivoted to its inner end immediately above its pivotal point upon the yoke member, 24, a ratchet pawl, 27. These ratchet pawls, 27, are arranged on opposite sides of the ratchet wheel, 23, and have their inturned ends spring pressed into engagement with the teeth of said wheel and their out-turned ends passing through limiting slots, 28, formed in the sides of the yoke member and adapted to limit the downward movement of the packing arms, 25. It will of course be understood that as the shaft, 21, and the ratchet wheel, 23, are stationary with respect to the guiding arms that when the packing arms are allowed to drop at their outer ends they carry with them the pawls, 27, and as these are in engagement with stationary teeth upon the ratchet wheel, the arms and yoke member, 25 and 24, respectively, are caused to rotate upon the shaft, 21.

When the parts are allowed to assume their normal position by reason of the operating lever, 8, being dropped out of engagement with the drum, the arms, 25, engage the silage and pack it, and at the same time return to normal position parallel with the guiding arms, 18. At this time the pawls, 27, ride idly over the ratchet wheel and engage another set of teeth for the succeeding operation. It will thus be seen that as the device is raised and lowered automatically the packing arms rotate and strike the silage at a different point each time and that upon each movement of the arms the smoothing fingers, 26, level the silage in the silo.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:

1. An attachment for silos comprising a packing device, means for reciprocating said packing device, and means for rotating said packing device intermittently.

2. An attachment for silos comprising a packing device, means for raising the same, means operated upon raising said packing device to rotate the same a pre-determined distance, and means to release said raising means.

3. A packing attachment for silos comprising guiding means, packing means carried by said guiding means, means for raising said guiding and packing arms, and means carried by the packing device for leveling the material.

4. A packing attachment for silos, comprising guiding means, packing means journaled on said guiding means, means carried by said packing means and adapted to coact with means carried upon the guiding means to rotate said packing means, means pivoted to the packing means for leveling the material being operated upon, and means for reciprocating said packing means.

5. In a device of the class described, the combination with a silo, of guiding rods mounted in the silo, guiding arms adapted to reciprocate on said rods, packing members pivotally connected to said guiding arms, means for reciprocating said guiding arms, and means for rotating said packing members in the reciprocation of said guiding arms.

6. In a device of the class described, the combination with a silo, of guiding rods secured therein, guiding arms mounted to reciprocate on said rods, a supporting yoke pivoted to the guiding arms, packing members pivoted to said yoke, means for raising said guiding arms, means operated upon the raising of said arms to rotate said packing members, and means to release said raising means.

In testimony whereof I have hereunto set my hand in presence of two subscribing witnesses.

GEORGE R. ROGERS.

Witnesses:
  DWIGHT EVANS,
  WILL MASTERSON.